United States Patent
Fleming, Jr. et al.

[15] 3,640,162
[45] Feb. 8, 1972

[54] WEB-SAMPLING METHOD AND APPARATUS

[72] Inventors: John W. Fleming, Jr.; James Michael McMullen, both of Columbus, Ohio

[73] Assignee: Industrial Nucleonics Corporation

[22] Filed: July 24, 1969

[21] Appl. No.: 870,796

Related U.S. Application Data

[62] Division of Ser. No. 601,750, Dec. 14, 1966.

[52] U.S. Cl. ................................83/52, 83/105, 83/167, 83/433, 83/620, 83/622, 83/697, 83/919
[51] Int. Cl. .........................................B26d 7/26, B26f 1/38
[58] Field of Search.....................83/52, 105, 167, 433, 530, 83/620, 622, 697, 919

[56] References Cited
UNITED STATES PATENTS 2,837,155  6/1958  Cundiff et al. ........................83/919 X
2,853,133  9/1958  Norman et al. .......................83/919 X
3,276,303  10/1966  Tompos................................83/919 X Primary Examiner—James M. Meister
Attorney—Allan M. Lowe, James Michael, James Michael McMullen, John W. Fleming, Jr., William T. Fryer, III, C. Henry Peterson and James J. O'Reilly

[57] ABSTRACT

Method and apparatus for cutting samples from a longitudinally moving web in order to check calibration of online moisture gauge. The cutter and gauge are mounted on a carriage so that both may be moved transversely relative to the moving web in order that the cut sample has the same characteristics as the portion analyzed by the gauge. The cutter comprises a pair of blade edges tapering from a common point where the edges selectively intersect the web.

48 Claims, 12 Drawing Figures

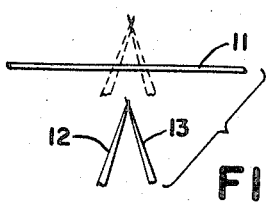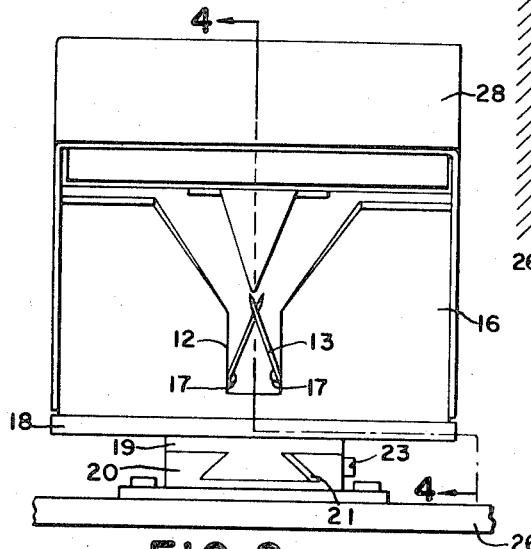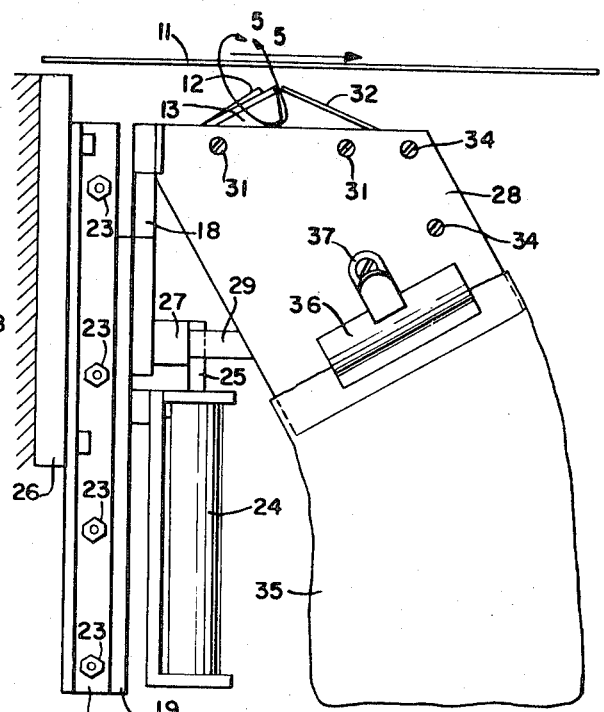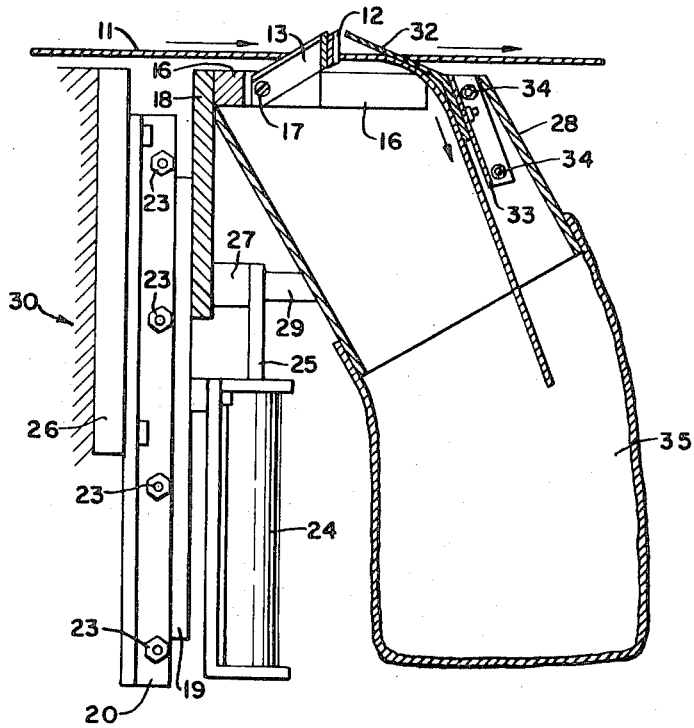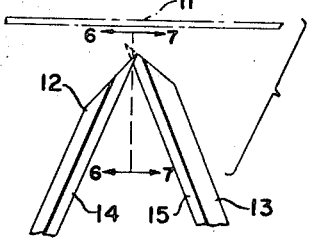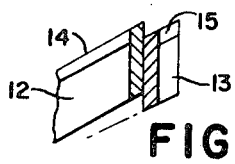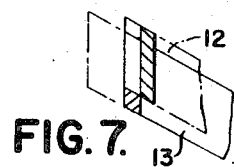
INVENTORS
James M. McMullen &
John W. Fleming
ATTORNEYS INVENTORS
James M. McMullen &
John W. Fleming BY  *Lowe & King*

ATTORNEYS

WEB-SAMPLING METHOD AND APPARATUS

This application is a divisional application of our copending application, Ser. No. 601,750, filed Dec. 14, 1966, for Web-Sampling Method and Apparatus.

The present invention relates generally to systems for removing samples from a web, and more particularly to a station for cutting samples from a web moving longitudinally relative to the station comprised of a pair of blade edges tapering from a common point where the edges selectively intersect the web.

In many applications dealing with the processing of web material, such as paper, metal foil or cellophane, it is necessary to cut a sample from the interior of the web as it moves in the manufacturing process. For example, in paper manufacture, online moisture-measuring equipment must be frequently checked to determine if it is properly calibrated. To ascertain if the online moisture-measuring equipment is properly calibrated, a sample is cut from the web downstream of the moisture measuring equipment and the sample is fed into a container where the properties of the sample do not change.

In the manufacture of paper, it is necessary to monitor the moisture and basis weight (the combined weight per square foot of the paper fiber and the moisture included therein) during the manufacturing process. These parameters are measured by gauges that monitor a relatively small area across the web at any time. To provide an indication of the entire web characteristics, the gauges are translated transversely of the longitudinally moving web. If the gauges were maintained at the same transverse position relative to the web, the great variations that exist in the characteristics of the paper across its width would not be measured.

These industrial measuring devices, however, require relatively frequent calibration to determine of they are providing accurate measurements. Previously, gauge calibration was accomplished by manually removing a section of the web with manually operated knives. In addition to being extremely slow and crude, manual paper removal changes the sample characteristics compared to what they are at the time when a measurement is being made. Variations in the sample occur because of: handling; moisture leaving the sample and escaping into the atmosphere; and difficulty sometimes encountered in packing the sample into a container for storage. Of course, the manual removal of samples from a paper web necessitates a complete shutdown of the manufacturing process and reduces mill efficiency. Another disadvantage attendant with manual cutting of samples is the possibility of the sheet or web being torn from one edge to another, whereby the sheet must be reapplied to a roller.

According to the present invention, these problems are obviated by utilizing an automatically activated cutter that has its transverse position relative to the web aligned with the gauges being calibrated. The cutter and gauges are arranged so that they may both be moved transversely relative to the longitudinally moving paper web whereby the sample cut has the same moisture and basis weight characteristics as the portion of the web analyzed by the gauges. By translating the gauges and cutting mechanism in synchronism across the web, calibration of the gauges for a plurality of different values is achieved because the paper characteristics vary considerably in moisture and basis weight as a function of the distance across the paper.

In cutting a sample from a moving web in a paper-manufacturing process, it is, of course, desirable for the sample to be removed without reducing the velocity of the sheet material as it moves by the cutter. To our knowledge, there has been no cutting device developed that is capable of cutting paper at the web velocities attained with modern papermaking machinery, wherein the web is translated on the order of 1,700 feet per minute and weighs between 15 and 20 pounds per 1,000 square feet.

According to the present invention, cutting samples from a paper web moving at velocities on the order of 1,600 or 1,700 feet per minute and with a weight of approximately 8 to 150 pounds per 1,000 square feet, can be accomplished with a cutter having a pair of cutting edges that are selectively brought into engagement with the web so that they cut two slits having a common point on the web. After the cutting operation has been terminated, the cutter is returned to approximately the same position where it was located prior to the cut, whereby there is formed a sample with the shape of an elongated hexagon having a pair of parallel sides and additional sides tapering at either end. According to one embodiment of the invention, the blade edges are formed from a pair of separate knives that cross each other slightly so that one blade is positioned downstream of the web relative to the second blade. In another embodiment, the blades have a common apex and are formed as a single V-shaped member that pierces the web.

The cross blade configuration is preferred over the V-shape because the material cut does not have an opportunity to collect between the blades. An essential aspect of the invention, however, is that the blade edges intersect a common point on the web during the cutting operation. If the blade edges do not intersect a common point on the web, no sample will be taken from the web because there will be no mutual meeting point of the two separate slits or cuts.

In order to provide a mutual meeting point for the blades in the separate two blade configuration, the blades must be crossed. We have found that separate blades have tendency to spread outwardly at the end of each cut in response to the force exerted on them by the moving web because they are thin and not infinitely rigid. If the separate blades have a common apex, and are not crossed, the slight outward spreading prevents the two separate cuts from ever intersecting each other. Of course, if the two cuts do not join, no sample is taken from the web and two elongated slits are merely placed therein.

It has also been found that the cutting blades are most advantageously positioned so that they slant in a direction against the web movement. Optimum results occur with the blades so positioned because the web has a tendency to be flexed as the blades initially cut. By positioning the blades so that they enter the sheet or web in a direction against the movement of the web, the web is driven downwardly against the blades and is not flexed upwardly to a position where the blades may not shear the sheet.

Another aspect of the present invention, particularly concerned with maintaining the properties of the sample as they were at the time when the cut was made, comprises deflecting the cut sample from the remainder of the web by means of a tongue. The tongue is positioned downstream of the cutting blade so that the cut sample is directed through a chute into a plastic bag which preserves the moisture and basis weight properties of the sample, as described in U.S. Pat. No. 3,276,303.

Another feature of the present invention is that the gauges are coupled to recorders that have marks inserted thereon in synchronism with cutting of the sample. Thereby, the cut sample can be analyzed and quickly compared with recorder charts responsive to the output of the recorders.

It is, accordingly, an object of the present invention to provide a new and improved system for cutting samples from a moving web.

It is another object of the present invention to provide a cutter for removing samples from webs traveling on the order of 1,600 or 1,700 feet per minute, whereby the time for manufacturing webs of paper and the like is not reduced to obtain a sample.

It is an additional object of the present invention to provide a system for cutting samples from a moving web and feeding the sample to a container where it is maintained in the same condition as existed at the time when the sample was cut.

An additional object of the present invention is to provide a web-sample cutter wherein material is not collected between the blades utilized for slitting the sample from the web.

Still another object of the present invention is to provide a system for cutting samples from a moving web by utilizing a pair of separate blades arranged so that the adverse effects associated with the tendency of the blades to spread at the end of a cut are obviated and the possibility of material collecting between the blades is avoided.

Still another object of the present invention is to provide a system for cutting samples from a moving web wherein the cutting apparatus may be utilized for taking a plurality of samples from the same web and without stopping the web since the cutter position relative to the web is approximately the same prior to and after a sample has been taken.

Still an additional object of the present invention is to provide a relatively inexpensive, efficient and maintenance free system for removing samples from a moving web.

Still another object of the present invention is to provide a new and improved system for determining the calibration of gauges utilized in analyzing the characteristics of a moving web.

Yet a further object of the present invention is to provide a system for automatically cutting samples from the same transverse portion of a moving web as it is analyzed by a gauge for measuring parameters of the web, whereby the gauge calibration can be determined with measurements made from the cut sample.

An additional object of the invention is to provide a system for ascertaining the calibration, over a relatively wide range, of gauges utilized for monitoring the characteristics of a moving web, wherein a sample is taken from the web at a plurality of positions across a web that is susceptible to appreciable variations along its transverse dimension.

The above and still further objects, features and advantages of the present invention will become apparent upon consideration of the following detailed description of several specific embodiments thereof, especially when taken in conjunction with the accompanying drawings, wherein:

FIG. 1 schematically illustrates one embodiment of the invention;

FIG. 2 is a top view of one cross-blade cutting station embodiment of the invention;

FIG. 3 is a side view of the cutting station illustrated in FIG. 2;

FIG. 4 is a sectional view of the cutting station, taken along the lines 4—4, FIG. 2;

FIG. 5 is an enlarged view of the blades and paper, taken in the area indicated by the lines 5—5, FIG. 3;

FIG. 6 is a side sectional view of the blades taken through the centerlines 6—6, FIG. 5;

FIG. 7 is a side sectional view of the blades taken through the centerlines 7—7, FIG. 5;

Figure 8:
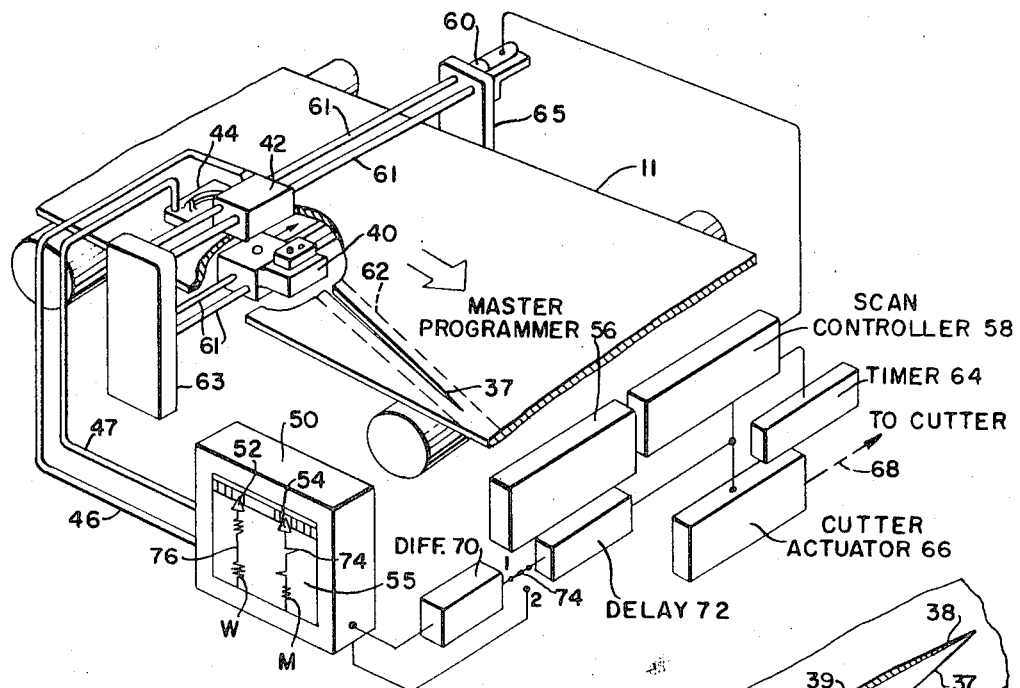
FIG. 8 is a perspective view of the gauges and recording instruments in combination with the cutting station illustrated in FIGS. 2—7, wherein the blades are illustrated as cutting a sample from a moving web from within a transverse measurement zone.
Figure 9:
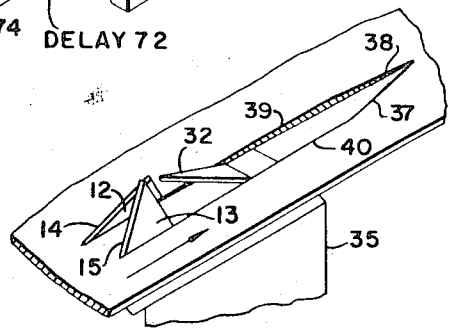
FIG. 9 is an enlarged partial perspective view of the cutter blades in the process of cutting a sample strip.

Reference is now made to FIG. 1, wherein the web 11 to be cut for removing samples therefrom is assumed to be translated in a plane at right angles to the sheet in which the drawing lies. Positioned in the quiescent condition above or below web 11, which is considered hereafter as being a moving sheet of paper being manufactured, are cutting blades or knives 12 and 13. The sharpened edges of blades 12 and 13 lies at right angles to the direction in which web 11 is translated, whereby the paper engages and is sheared by the sharpened knife edges when the blades are translated upwardly to the dotted line position. When it is desired to terminate the cut, blades 12 and 13 are returned to the solid-line position indicated, whereby there is formed a sample shaped as an elongated hexagon having in its center a pair of parallel sides and at either of its ends a pair of tapering sides that meet at a point.

In the embodiment illustrated specifically in FIG. 1, blades 12 and 13 cross each other slightly at their tips and taper in opposite directions away from the crossing point which lies on the centerline between them. Alternatively, the knife may comprise a U-shaped member having a pair of cutting edges. Blade 13 is positioned behind blade 12 and extends slightly above the tip of the latter blade, although the forward blade could extend slightly above the rearward blade without changing the operation of the cutter. Because blades 12 and 13 do not touch one another, material is not embedded therein nor is it collected between the two cutting edges of the blades. Another advantage in utilizing two separate blades is that the blades need not be sharpened at their uppermost tips, whereby the expense involved in blade fabrication is reduced. Blades 12 and 13 preferably slope with or against the direction of movement for sheet 11. While it is preferred that the blades 12 and 13 contact the sheet at a direction other than at right angles to the direction in which web 11 is translated, it may be desirable to employ an angle of attack of 90° in some applications. If blades 12 and 13 are inserted through the paper in a direction other than at right angles to the paper movement, sliding action occurs between the blades and paper, thereby facilitating shearing of the web. If the blades do not slide relative to the sheet being cut, the sheet may be broken, rather than sheared, and uneven, irregular cutting may occur.

In a particular embodiment of the invention illustrated by FIGS. 2–9, blades 12 and 13 are positioned so that they slope in the same direction as web 11 is translated. In order to obtain optimum results with this configuration, it has been found that the angle of attack between blades 12 and 13 and sheet 11 is on the order of 35°, i.e., the angle of the cutting surfaces 14 and 15 of blades 12 and 13 relative to the horizontal plane in which web 11 is translated in FIG. 3 is 35°. It has been found that an angle of attack less than 30° frequently causes sufficient upward deflection of web 11 when the blades come in contact with it to prevent the blades from penetrating through the web. On the other hand, if the angle of attach for cutting edges 14 and 15 is in excess of 40°, web 11 is often broken rather than sheared, whereby a clean cut is not obtained.

Reference is now made more particularly to FIGS. 2–9 wherein blades 12 and 13, as well as the specific structure utilized for translating them into engagement with web 11, are illustrated. As shown in FIGS. 2 and 4, the ends of blades 12 and 13 remote from their crossing point are bolted to horizontally extending plate 16 having a Y-shaped aperture therein. Blades 12 and 13 are fastened to plate 16 by bolts 17 that extend into threaded bores on opposite sides of the stem of the Y-shaped aperture. Blades 12 and 13 taper inwardly and upwardly from their connection by bolts 17 to plate 16 so that blade 13 crosses above blade 12 and extends farther from the stem of the Y-shaped aperture.

Horizontally disposed plate 16 is rigidly connected to vertically extending plate 18, located upstream of cutting blades 12 and 13. Plate 18 is fixedly mounted on male slide 19, which together with female guide 20 and strip 21 comprises a V guide with a removable strip. Removable strip 21 is fixedly mounted on female guide 20 by means of bolts 23, whereby the strip can be replaced when it wears.

To selectively translate guide 19 as well as blades 12 and 13 vertically relative to fixedly mounted guide 20, air cylinder 24, for driving vertically extending piston 25, is fixedly connected to post 26, that also carries guide 20, and is fixedly secured to gauge-housing 30. The end of piston 25 extending from cylinder 24 is connected to plate 18 by block 27 and is also connected to chute 28 by means of arm 29.

Chute 28 comprises four plates arranged as a square hollow shaft. The plates are connected at their upper edges by bolts 31 to horizontally extending plate 16. Centrally mounted in the upper end of chute 28 and extending above the top of the chute is triangularly shaped tongue 32 for deflecting or guiding the sample cut from web 11 through the chute. The apex of tongue 32 is positioned in close proximity to and slightly below the upper tips of blades 12 and 13. Thereby, as blades 12 and 13 are translated upwardly through web 11, tongue 32 follows through the aperture cut in the web. Of course, the uppermost surface of tongue 32 is slightly below the upper tips of blades 12 and 13 to preclude engagement of the tongue with the web prior to the knives cutting a sample. Because the sample cut from web 11 may veer slightly to one side or the other as it passes through chute 28, tongue 32 is formed as a triangle having sides sloping away from blades 12 and 13, rather than as a rectilinear bar or the like. For the same reason, the apertures in plate 16 downstream of where blades 12 and 13 engage web 11 are tapered outwardly.

Tongue 32 is curved or bent from the upper surface of chute 28 so that it extends toward blades 12 and 13. Within chute 28, tongue 32 is positioned so that it extends at approximately a 60° angle below the horizontal plane, whereby the cut sample is definitely turned into chute 28. Tongue 32 is maintained in situ on chute 28 by being bolted to plate 33, which is in turn rigidly connected to the sidewalls of chute 28 by bolts 34.

To receive the sample cut from web 11 that emerges from chute 28, plastic or cellophane bag 35 is positioned at the end of the chute remote from blades 12 and 13. Bag 35 is fastened to the end of chute 28 by spring biased clips 36, mounted on opposite walls of the chute by means of bolts 37. Samples entering bag 35 are preserved in the same condition as they were at the time that the cut was made in web 11 because the bag is very closely positioned to the blades and the contents of the bag are not directly exposed to ambient environmental conditions. After a sample or a plurality of samples have been cut, bag 35 is removed from chute 28 by opening spring-biased clips 36 and the bag is then sealed to preserve the characteristics of the cut sample.

As illustrated most particularly in FIGS. 5–7, only cutting edges 14 and 15 of blades 12 and 13 that engage and shear web 11 are sharpened. At the upper tips of edges 14 and 15, blades 12 and 13 slope downwardly so that the uppermost portions of the blades do not contact web 11 even when the blades are initially moved through the web. Hence, there is no need for the upper tips of blades 12 and 13 to be sharpened, whereby the cost of blade fabrication is reduced. Of course, blades 12 and 13 should be as thin as economically and structurally possible to provide the best cut; blade thicknesses on the order of 1/64 inch have been found satisfactory for combined performance and expense criteria.

The tips of blades 12 and 13 are mutually separated from center line 6—6 and spaced apart by ⅛ inch to 1/16 inches. As blades 12 and 13 are brought into contact with web 11, each of cutting edges 14 and 15 forms a separate slit in the web. The two slits meet approximately at the center line between blades 12 and 13 to initiate the tapering sides of the sample. As blades 12 and 13 are withdrawn from web 11, the moving web exerts a force on the blades to spread them slightly from the center line 6–6. Hence, the tapering sides at the end of the cut sample meet at a smaller angle than the corresponding sides at the beginning of the cut sample. The force separating blades 12 and 13 as they are withdrawn from web 11 is not, however, great enough to cause the blades to uncross. Because blades 12 and 13 remain crossed, the two slits formed by the blades meet to terminate the sample as the blades are lowered.

To provide a more complete understanding of the manner in which the present invention functions, a complete operation cycle will be described. Prior to activation of the sample cutter, air cylinder 24 is deactivated, whereby piston 25 is in the lower position illustrated in FIG. 3. With piston 25 in the lowered position, cutting blades 12 and 13 lie beneath the lower surface of web 11 and no sample is fed into bag 35. In response to activation of air cylinder 24, piston 25 translates blades 12 and 13 upwardly towards web 11. The uppermost tip of cutting surface 15 of blade 13 first engages web 11 at a point slightly downstream of where the upper tip of blade 12 is located. Thereby, blade 13 begins to cut a slit in web 11. As blades 12 and 13 continue to rise, the slit extends outwardly, as indicated by reference numeral 37, FIG. 9. Within milliseconds after blade 13 has begun to slit web 11, blade 12 comes into engagement with the web and initiates a second slit 38. Blades 12 and 13 cut a common point on the web, approximately through the centerline 6—6 (FIG. 5), whereby slits 37 and 38 have a mutual contact point, forming the apex at one end of the cut sample. It is noted, however, that a small slit is cut in web 11 by each of blades 12 and 13 at a position slightly upstream of the apex at the leading edge of the cut sample.

As blades 12 and 13 continue to rise, the distance between slits 37 and 38 enlarges until the vertical position of the blades is stabilized, as indicated by FIG. 4, generally at a location whereby the separation of the slits is approximately ½ inch. The width of the cut sample is changed from one cut to another so that cutting surfaces 14 and 15 of blades 12 and 13 do not wear excessively in one location. The sample cut from web 11 continues moving with the web in a generally horizontal plane until it engages the wall of tongue 32 facing the cutting blades. The cut sample is deflected downwardly at an angle of approximately 20° by tongue 32 and is fed into bag 35 at an angle approximately 60° from the horizontal.

After the desired length of cut has been taken, air cylinder 24 is deactivated, whereby piston 25 returns to the unactivated position illustrated in FIG. 3. As piston 25 returns to its quiescent position, blades 12 and 13 are withdrawn from web 11, whereby the end of the sample is terminated with sides that taper towards each other. As blades 12 and 13 are withdrawn from web 11, they have a tendency to spread apart because they are relatively thin, on the order of 1/64 inch in thickness, and are not infinitely rigid. Spreading of the blades is to an extent of less than 1/16 inch whereby both of them intersect a common point on sheet 11 as they are lowered, even though they are spread outwardly. Thereby, the tapering trailing edges of the cut sample meet to provide a definite end to the sample. If blades 12 and 13 do not intersect a common point on web 11 as they are withdrawn from the web and the two slits did not converge on each other, the sample would not be cut from the web and the cut material could possibly be pulled out of bag 35 and chute 28 to flap beneath web 11.

Figure 10:
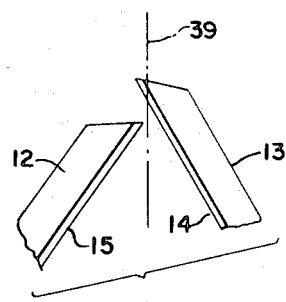
FIG. 10 is an enlarged front view of a modification of the crossed cutting blades wherein only one of them extends beyond the centerline between them.

While the crossed-blade configuration of FIGS. 2–9 is advantageous because it obviates the spreading problem, it has a slightly deleterious effect on web 11 in that a pair of V-notches are formed in the web slightly upstream and possibly downstream of where the sample is cut. The V-notches can be easily caught in and foul web-processing equipment downstream of the cutter. These notches are formed because blades 12 and 13 enter and might leave web 11 on opposite sides from their common point where, e.g., slits 37 and 38 are initiated. To obviate this problem, blades 12 and 13 can be crossed in a modified manner as illustrated in FIG. 10 wherein only blade 13 extends beyond center line 39 and blade 12 terminates at the center line. In the blade configuration of FIG. 10, the tips of edges 14 and 15 are laterally spaced by ⅛ inch to 1/16 inch. As the cutter is translated into web 11, a slit is initially formed only by upper blade 13. Lower blade 12 enters web 11 at a point coincident with the slit formed by blade 13 so that only one slit is formed in the web upstream of the cut sample, rather than a V-notch. As blades 12 and 13 are withdrawn from web 11, they again have a tendency to spread. As in the previously described configuration, the blade spread is not great enough to overcome the cross-blade configuration, whereby the slits at the rear end of the cut sample meet. The slits forming the sides of the cut sample do not meet at the center of the cut sample, however, because lower blade 12 is deflected so that its tip is removed to the left of centerline 39. A single slit is usually cut in web 11 downstream of the cut sample as blade 13 is finally lowered, although occasionally the extreme upper tips of blades 12 and 13 finish cutting slits at a common point on the web, whereby no slit downstream of the sample occurs.

Figure 11:
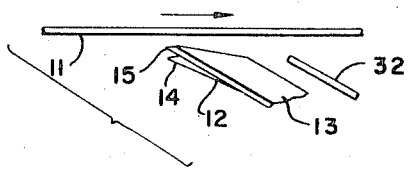
FIG. 11 is a side view illustrating another modification of the cutting blades wherein they slant against the sheet or web being cut.

Reference is now made to FIG. 11 of the drawings, wherein there is illustrated a further modification of the present invention wherein blades 12 and 13 are positioned so that their angle of attack is against the direction of motion of web 11. It is to be understood that the cross-blade configurations of both FIGS. 5 and 10 can be positioned with an angle of attack against the web movement.

By positioning blades 12 and 13 so that they slope in a direction against the movement of web 11, any tendency of the web to flex and rise upwardly out of engagement with cutting edges 14 and 15 is obviated. Instead, with the blades sloping against the direction of movement for web 11, there is a tendency for the web to be driven downwardly into cutting edges 14 and 15 so that piercing of the web is assured as blades 12 and 13 rise upwardly.

As in the case of the embodiment of FIGS. 2–9, the angle of attack for blades 12 and 13 in the embodiment of FIG. 11 is preferably 35°, with limits of between 30° and 40°. If the blade angle of attack is less than 30°, there is an excessive tendency for web 11 to be deflected downwardly, whereby it is not pierced by the blades 12 and 13. If the upper limit of 40° is exceeded, sheet 11 is broken rather than sheared by blades 12 and 13 as there is insufficient sliding contact between the blades and the web to enable proper shearing forces to be developed. Breaking the sheet rather than shearing it prevents an evenly cut sample from being taken from web 11, whereby the quality of the resultant sample is impaired and an increased probability of fouling downstream web processing equipment arises.

Figure 12:
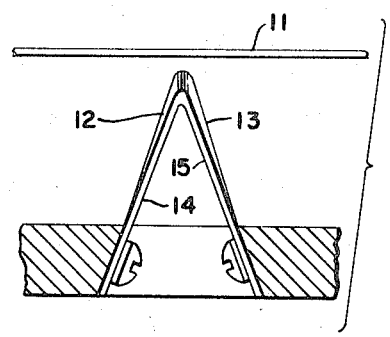
FIG. 12 is still another embodiment of the invention wherein the cutting blades are comprised of a single unitary structure having an inverted V-shape.

Reference is now made to FIG. 12 of the drawings, wherein there is illustrated still another embodiment of the present invention. In the embodiment of FIG. 12, blades 12 and 13 are not crossed or separated but are bonded to each other by, for example, spot welding, to form a single V-shaped cutting element. The blade configuration can have an angle of attack either in the same direction as or against the movement of web 11, as indicated by FIG. 3 and FIG. 11, respectively.

While the V-shaped configuration of FIG. 12 is easier to handle and install at the cutter station than the separated blades of the embodiments illustrated in FIGS. 1–11, there is the disadvantage that the upper tips of blades 12 and 13 must be sharpened. If the upper tips of blades 12 and 13 are not sharpened web 11 will not be sheared as the blades are forced through the web. It is desirable to avoid sharpening the tips of the blades because of the expense involved in forming such blades and in maintaining them. Another disadvantage associated with the configuration of FIG. 12 is that material from the web has a tendency to be embedded in the intersection of blades 12 and 13, thereby destroying its effectiveness to a great degree after repeated usage.

Referring again to FIG. 8, the sample cutter of the present invention may be used to cut a strip extending transversely across the width of sheet 11 carried between a pair of supporting roll members 39 and 41. To this end, the cutter housing may be carried across the sheet 11 and actuated to remove a strip from within the edges of the sheet. This is a great advantage because on many sheeting lines the profile of the variable being measured may vary across the sheet making a sample taken in single point, i.e., at a fixed cross-sheet location, nonrepresentative of the entire sheet.

Since the primary purpose of the sample cutter is to provide a calibration check on one or more measuring instruments positioned adjacent to the sheet, it may be desireable to mount the cutter housing 40 on the instrument carriage. In the illustrated case, a beta-radiation gauge 42 and a moisture gauge 44 are preferably constructed as disclosed in U.S. Pat. Nos. 2,790,945 and 2,920,272, assigned to the same assignee as the present application. Briefly, the radiation gauge measures the basis weight of the sheet 11 and transmits a signal over line 46 to a recorder 48. The moisture gauge 44 comprises a probe coupled by line 47 to recorder 50. For convenience, the moisture gauge is mounted on the basis weight gauge bracket. Recorder 50 includes two marking pens 52 and 54 to provide a basis weight trace W and a moisture trace M on chart 55. Alternatively, two recorders could be used to provide separate records of the variables of interest.

A master programmer unit 56 directs the movement of the gauges 42 and 44. Operating personnel may require that the gauges be continuously maintained either in single point at either edge of the sheet or at any position in between, or in a scanning mode. A scan controller 58 causes a gauge positioning motor 60 to drive the gauges back and forth across the width of the sheet 11. Alternatively, the measuring instruments may be automatically switched from one mode to the other.

Regardless of the mode of operation, the gauges 42 and 44 monitor a defined measuring area, and a zone 62, extending down the length of sheet 11, defines the portion of the sheet which passed adjacent to the gauges and was measured thereby. It is desired to remove a strip from within this zone to check the calibration of the moisture gauge 44, for example. To accomplish this, our system uses any of cutter blade configurations described above to automatically remove the desired strip and to automatically identify on the chart 55 what portion of the recorded indications corresponds to the removed strip.

If the master programmer 56 calls for a scanning type measurement, the scan controller 58 moves the gauge assembly from left to right (as viewed in FIG. 8) across the sheet 11 on traversing rods 61 carried between a pair of upstanding end members 63 and 65. Both weight and moisture signals are concomitantly displayed on the chart 55. After the gauges are sufficiently on sheet, timer 64 generates a voltage pulse to energize a cutter actuator 66 coupled to the cutter as indicated by the heavy dotted lines 68. The cutter blades 12 and 13 (see FIG. 9) rise through the sheet 11 and the cut strip is deflected by tongue 32 down into the sample storage bag 35.

Timer 64 times out before the gauges reach the other side of the sheet 11 and the voltage pulse is removed. Whereupon the cutter blades drop back down through the sheet 11 ending the sample.

An R-C differentiator 70 may be employed to pulse the moisture pen 54 as the cutter is energized and deenergized. Opposite-going pips 74 on the chart 55 define that portion of the trace M representing the moisture content of the removed strip. Since there is some time lag due to the inertia of the cutter blade housing, a delay unit 72 may be provided to delay the recorder chart identification for about one second.

Alternatively, other identifying techniques may be employed such as, for example, clamping the recorder pen motors. A switch 74 may be switched to an alternate position to clamp the basis weight servo pen motor during the sampling period. In this case, the weight trace W is drawn with a straight-line segment 76. Calibration personnel can tell what portion of the moisture trace corresponds to the removed sample by visually horizontally superimposing the straight-line segment 76 of the basis weight trace W onto the moisture trace M. Any time lags due to different time responses of the two measuring and recording systems must, of course, be taken into account.

While both types of chart identification are illustrated, they cannot both be provided simultaneously by the apparatus shown in FIG. 8. While both pens may be clamped, it is advantageous not to clamp the one associated with the gauge to be calibrated, since it is usually desirable to know what the measured values were prior to and subsequent to the removal of the sample.

Translating gauges 42 and 44 across the width of sheet 11 has an advantage of enabling the gauges to be calibrated for conditions that may vary widely. The widely varying conditions arise because the moisture and basis weight of paper sheet during the manufacturing process are frequently variable by a factor of 2:1 from the center of the sheet to either of its edges or from one edge to the other. Hence, an indication of the dynamic calibration of gauges 42 and 44 can be attained merely by translating them across the width of web 11 and cutting a transverse sample that intersects each of the analyzed points. While gauges 42 and 44 are longitudinally removed from blades 12 and 13, the readings from chart 55 can be correlated with data taken from the cut samples because the time required for web 11 to propagate from the gauges to the cutter is on the order of ½ millisecond, a time interval less than the response time of the recorder pens 52 and 54.

After the sample has been cut and blades 12 and 13 lowered, the sample is sealed in bag 35 and transported to a laboratory where a very precise measurement of the moisture content of the cut web is made. The precise laboratory measurement is compared with the readings taken by the moisture gauge 44 and indicated on the recorder chart 55 between the pips 74. Any disagreement between the measured and the actual values of moisture necessitates adjustment of the moisture-measuring and readout circuitry.

The operation of the system in single point will be obvious from the above description. In this case, a longitudinal zone is measured and timer 64 may be adjusted to provide a strip of any desired length in accordance with the speed of travel of the sheet 11. The cross-sheet location of the zone may be selected by operating personnel.

In alternative embodiments, the cutter may be mounted upstream from the measuring gauge because it removes only a narrow strip from within the measuring zone. Instead of being linearly displaced, the cutter blade housing may be pivotally mounted and driven by a linkage to swing on an arc toward the sheet 11. The width of the removed strip can be controlled by varying the extent to which the blades 12 and 13 are pushed into the sheet 11. It may be desirable to oscillate the cutter to spread the wear of the blades 12 and 13 along the length thereof.

The sample-cutting and gauge-correlation techniques described hereinabove have been successfully employed on industrial lines in tests of the most severe nature. For example, the system of FIG. 8 has been used to cut and correlate thin paper sheet having a weight per unit area of 8 pounds per 1,000 square feet and traveling at a speed of 2,000 feet per minute. Strips of the desired length are provided and sheet breakdown has been virtually eliminated.

While we have described and illustrated several specific embodiments of our invention, it will be clear that variations of the details of construction which are specifically illustrated and described may be made without departing from the true spirit and scope of the invention as defined in the appended claims.

We claim:

1. A station for cutting samples from web moving longitudinally relative to the station comprising a pair of blade edges, both said edges being positioned for selectively cutting a common point on said web and tapering in opposite directions away from said point, each of said blade edges being positioned to cut a slit having a relatively constant transverse dimension in the web, and means for bringing said blades into and out of engagement with said web from substantially the same rest position relative to the longitudinal position where said blades engage said web.

2. The combination of claim 1 wherein said blade edges are separated from each other to prevent the cut sample from accumulating between the edges.

3. The combination of claim 2 wherein said edges have tips for piercing said web, and said blade edges are crossed relative to each other slightly to the rear of said tips.

4. The combination of claim 3 wherein said blade edges cross each other at the common point.

5. The combination of claim 4 wherein said edges slope in the same general direction as said web is moving.

6. The combination of claim 5 wherein the angle of attack of said blades as they cut the web is between 30° and 40°.

7. The combination of claim 4 wherein said edges slope in a direction against the movement of said web.

8. The combination of claim 7 wherein the angle of attack of said blades as they cut the web is between 30° and 40°.

9. The combination of claim 2 wherein one of said blade edges terminates at the common point and the other edge extends beyond said common point.

10. The combination of claim 9 wherein said edges slope in the same general direction as said web is moving.

11. The combination of claim 10 wherein the angle of attack of said blades as they cut the web is between 30° and 40.

12. The combination of claim 9 wherein said edges slope in a direction against the movement of said web.

13. The combination of claim 12 wherein the angle of attack of said blades as they cut the web is between 30° and 40°.

14. The combination of claim 3 further including means positioned downstream of said edges and in proximity thereto for deflecting the cut sample from the remainder of the web.

15. The combination of claim 14 wherein said deflecting means comprises a guide having a surface for receiving the cut sample and for directing it into a passageway.

16. The combination of claim 15 wherein said guide has edges sloping in the direction of web movement away from blades that carry said edges.

17. The combination of claim 16 wherein said passageway includes means for carrying a removable container for receiving the cut sample.

18. The combination of claim 1 wherein said edges have common, joined tips forming an apex.

19. The combination of claim 1 further including means positioned downstream of said edges and in proximity thereto for deflecting the cut sample from the remainder of the web.

20. The combination of claim 19 wherein said deflecting means comprises a guide having a surface for receiving the cut sample and for directing it into a passageway.

21. The combination of claim 20 wherein said guide has edges sloping in the direction of web movement away from blades that carry said edges.

22. The combination of claim 21 wherein said passageway includes means for carrying a removable container for receiving the cut sample.

23. A station for cutting samples from a web moving longitudinally relative to the station comprising a pair of blade edges, both said edges being positioned for selectively cutting a pair of slits having a common point on said web and tapering in opposite directions away from said point, said blade edges being separated from each other to prevent the cut sample from accumulating between the edges, and means for bringing said blades into and out of engagement with said web.

24. The combination of claim 23 wherein said edges have tips for piercing said web, and said blade edges are crossed relative to each other slightly to the rear of said tips.

25. The combination of claim 24 wherein said blade edges cross each other at the common point.

26. The combination of claim 25 wherein said edges slope in the same general direction as said web is moving.

27. The combination of claim 26 wherein the angle of attack of said blades as they cut the web is between 30° and 40°.

28. The combination of claim 25 wherein said edges slope in a direction against the movement of said web.

29. The combination of claim 28 wherein the angle of attack of said blades as they cut the web is between 30° and 40°.

30. The combination of claim 23 wherein one of said blade edges terminates at the common point and the other edge extends beyond said common point.

31. The combination of claim 30 wherein said edges slope in the same general direction as said web is moving.

32. The combination of claim 31 wherein the angle of attack of said blades as they cut the web is between 30° and 40°.

33. The combination of claim 30 wherein said edges slope in a direction against the movement of said web.

34. The combination of claim 33 wherein the angle of attack of said blades as they cut the web is between 30° and 40°.

35. The combination of claim 23 further including means positioned downstream of said edges and in proximity thereto for deflecting the cut sample from the remainder of the web.

36. The combination of claim 35 wherein said deflecting means comprises a guide having a surface for receiving the cut sample and for directing it into a passageway.

37. The combination of claim 36 wherein said guide has edges sloping in the direction of web movement away from blades that carry said edges.

38. A method of cutting a sample from a longitudinally translating web moving in a plane comprising the steps of cutting a pair of intersecting slits in the longitudinally translating web by translating a pair of blade edges into contact with the web as the web is being longitudinally translated, said blade edges being translated into contact with the web with a direction of movement having a component at right angles to the plane, and varying the distance between the slits while maintaining the transverse dimension of the slits relatively constant by varying the extent each blade is translated with a component at right angles to the plane while in contact with the longitudinally translating web.

39. The method of claim 38 wherein each of said blade edges is located on a side of the sheet prior to being translated into contact with the sheet and translating each blade edge back to the same side of the sheet as it was located prior to the slits being cut after the slits are cut.

40. The method of claim 38 further including the step of deflecting the cut sample from the remainder of the web.

41. The method of claim 38 further including the steps of deflecting the cut sample from the web, and storing the cut sample in an environment wherein properties of the cut sample remain relatively constant.

42. The method of claim 38 further including the step of storing the cut sample in an environment wherein properties of the sample remain relatively constant.

43. The method of claim 38 further including the step of deflecting the cut sample from the remainder of the web by translating a tongue through the plane of the web into contact with the cut sample.

44. Apparatus for cutting a sample from a longitudinally translating web moving in a plane comprising a pair of blade edges, said blade edges being disposed out of contact with said web while the sample is not being cut, means for translating said blade edges with a component at right angles to the plane into contact with the web as the web is being longitudinally translated, said blade edges being positioned so that each cuts a slit in the longitudinally translating web and said slits intersect with each other, said blades being positioned relative to each other and the web so that as the blades are translated with a component at right angles into contact with the sheet by varying extents the separation between the slits is varied and the transverse dimension of the slits remains relatively constant.

45. The apparatus of claim 44 further including a tongue for deflecting the cut sample from the remainder of the web, means for translating said tongue with a component at right angles to the plane through the plane while the blades are translated with a component at right angles to the plane.

46. The apparatus of claim 45 wherein said deflector is positioned down stream of said blades and is positioned relative to said blades so that it enters the plane after the blades have begun to cut the strips.

47. The apparatus of claim 45 further including means for receiving and storing the cut and deflected sample, said means for receiving and storing maintaining sample properties substantially constant.

48. The apparatus of claim 44 further including means for receiving and storing the cut sample, said means for receiving and storing maintaining sample properties substantially constant.

* * * * *